(No Model.)
H. D. BABCOCK.
HORSE HAY FORK.
No. 328,997. Patented Oct. 27, 1885.
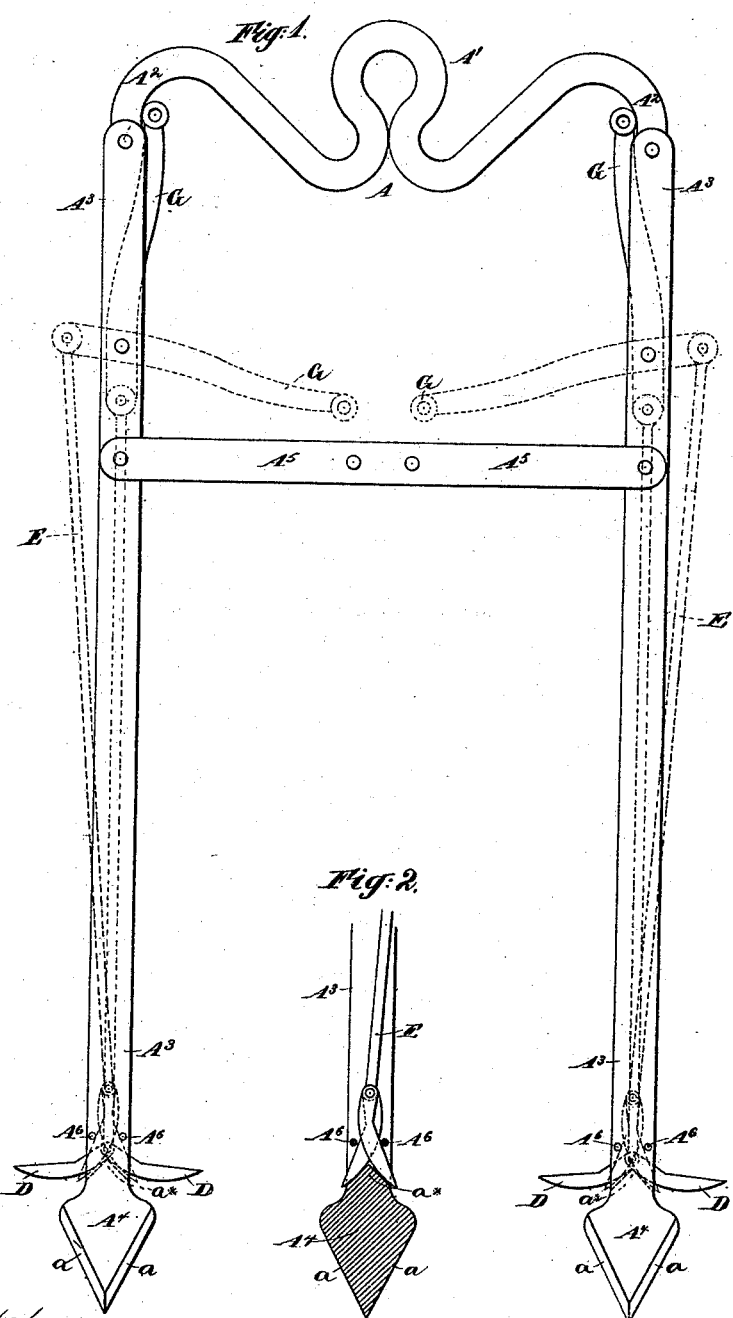

UNITED STATES PATENT OFFICE.

HENRY D. BABCOCK, OF LEONARDSVILLE, NEW YORK.

HORSE HAY-FORK.

SPECIFICATION forming part of Letters Patent No. 328,997, dated October 27, 1885.

Application filed April 3, 1885. Serial No. 161,146. (No model.)

*To all whom it may concern:*

Be it known that I, HENRY D. BABCOCK, of Leonardsville, Madison county, in the State of New York, have invented certain new and useful Improvements in Horse Hay-Forks, of which the following is a specification.

It has long been common to employ a device with two or more tines and barbs as a means for lifting hay and straw and transporting it to short distances, the points of the tines being thrust into and withdrawn from the hay while the barbs are in line with the tines. My fork is of this general character. I have made important improvements in the details.

A serious difficulty is found in inserting the tines into hay which is very densely compacted, as by having lain a long time subject to pressure. There must be sufficient size to afford strength, and it is difficult to displace the dense hay and thrust the tines in. I have devised a construction in which each tine is terminated by a thin spear-head having sharp cutting-edges, which act with a drawing-cut on the tough fibers of the hay and separate them, so as to cut a clean hole of sufficient size. The barb is immediately above, and on being thrown out engages strongly with uncut fibers and compels the mass above to rise when the fork is lifted. I employ two tines, each with two barbs, peculiarly operated. The inclined sides of the spear-heads are sickle-edged, so as to take hold of the fibers with a slight saw-like action. Whatever the condition in this respect, the edges should be kept as sharp as practicable. The cutting of the fibers greatly facilitates their displacement to allow the insertion of a tine and barb of reasonable size. The barbs should be of sufficient length to engage uncut fibers.

With my mode of operating the barbs no difficulty is found in the employment of sufficient barbs and of shifting them out and in to engage and disengage the hay.

The accompanying drawings form a part of this specification, and represent what I consider the best means of carrying out the invention.

Figure 1 represents the entire fork. The dotted lines show its barbs closed, ready to be thrust into the hay. The strong lines show the condition with the barbs extended ready to lift the hay. Fig. 2 is a vertical section of one of the spear-heads and immediately adjacent parts, with the barbs in the extended condition.

Similar letters of reference indicate like parts in both figures.

A is the body of the fork, certain portions being designated, when necessary, by additional marks, as $A' A^2$. The eye $A'$ serves for the attachment of the hoisting-rope. The iron of the fork is bent, as shown, so that without welding or other labor the entire head is formed from a single bar of iron with eye sunk to about the level of the upper ends of the tines. This is an economical construction, and allows a given rope and pulley to hoist the hay higher than would be possible with the eye above.

$A^3 A^3$ are pairs of narrow parallel plates of steel, riveted to the ends $A^2 A^2$ of the head, to constitute a tine, and $A^4$ is a sickle-edged spear-head at the lower end of each tine. The cutting-edges of these spear-heads are marked $a$.

D D are barbs, having smoothly and gently curved outlines, as shown, capable of sliding endwise with a turning motion in sufficient space provided between the plates $A^3 A^3$, composing a tine.

E E are links, each pivoted at one end to a corresponding barb and at the other end to a lever, G, which latter is turned by a cord connected to the hoisting-rope. (Not shown.)

$A^5$ is a cross-bar, which braces and stiffens the tines.

The upper end of each spear-head is formed with a double incline, $a^*$, which receives and spreads the barbs when they are forcibly depressed by the action of the link E, cross-pins $A^6 A^6$ extending across the spaces between the plates $A^3 A^3$, and being struck by the barbs when the link E is drawn up, compel the prompt folding downward and drawing inward of the barbs.

In the use of my fork the levers G are allowed to stand horizontally, so that the barbs D are held in line with the tines when the latter are forced into the hay. In the act of being forced in, the cutting-edges $a$ of the spear-head $A^4$ sever the fibers of the hay, and the cut condition of the fibers greatly facilitates their bending and displacement, so that it is relatively easy to make way for the parts which are to follow. When the fork is properly inserted in the hay, the hoisting-rope (not shown) is pulled, the levers G are operated to depress the link E and turn the barbs D into a crosswise position, (shown in Fig. 1,) which causes them to engage with the uncut fibers of the hay and take firm hold. Now, the lifting of the fork by the rope while the barbs are in this position lifts the hay and holds it securely while it is moved to any point desired. To liberate it the levers G are retured to their original positions, thus bringing the barbs D into line with their respective tines, and the hay being then entirely released falls by its gravity, and the empty fork may be again used.

The shanks $A^3$ of my fork are of much less width than the body of the lance, which is barb shape. This reduces friction in inserting the fork into the hay, and affords free action to the barbs, allowing them to attain a position at a considerable angle to the plane of the fork-tine before coming in contact with the hay.

I am aware that barbs have been used in connection with cutting-tines for a similar purpose, as such features are shown in Patent No. 108,094 of 1870; but in that construction not only did the severed fibers bear strongly all along the shank of the tine, but the barbs met the same pressure at the first part of their movement. I seek to modify this friction and to give to the barbs a considerable movement before reaching the hay. The wide portion of my lance serves to hold the hay away from the tine for that purpose.

I claim as my invention—

1. In a horse hay-fork, the combination, with a tine having a lance-head, as $A^4$, of greater width than the shank of the time, and having formed upon its upper or rear side inclines $a^*$, of barbs arranged directly in rear of said lance-head and working in guides, whereby the said barbs may be protected from the pressure of the hay by the lance-head, as set forth.

2. The hay-fork described, consisting of the tines $A^3$, carrying lance-heads $A^4$ of greater width than the shanks of the tines and having cutting-edges $a$ and inclines $a^*$, as shown, the barbs D, arranged directly in rear of the lance-heads and held by guides $A^6$, and the levers G E, constructed and arranged for joint operation, as and for the purposes set forth.

In testimony whereof I have hereunto set my hand at Leonardsville, New York, this 24th day of March, 1885, in the presence of two subscribing witnesses.

HENRY D. BABCOCK.

Witnesses:
  H. M. AYLESWORTH,
  S. L. HUNTINGTON.